(12) United States Patent
Geiger et al.

(10) Patent No.: US 7,084,374 B2
(45) Date of Patent: Aug. 1, 2006

(54) HEATING FLANGE

(75) Inventors: Steffen Geiger, Asperg (DE); Thomas Giffels, Stuttgart (DE); Martin Eller, Ludwigsburg (DE)

(73) Assignee: Beru AG, Ludwigsburg (DE)

( * ) Notice: Subject to any disclaimer, the term of this patent is extended or adjusted under 35 U.S.C. 154(b) by 292 days.

(21) Appl. No.: 10/732,257

(22) Filed: Dec. 11, 2003

(65) Prior Publication Data

US 2004/0118388 A1 Jun. 24, 2004

(30) Foreign Application Priority Data

Dec. 11, 2002 (DE) ................................ 102 57 921

(51) Int. Cl.
*B60L 1/02* (2006.01)
(52) U.S. Cl. ........................ 219/205; 219/206; 123/549
(58) Field of Classification Search ........ 219/205–207, 219/532, 536, 537, 542, 546, 548; 123/543, 123/549, 557
See application file for complete search history.

(56) References Cited

U.S. PATENT DOCUMENTS

| 4,685,437 | A | | 8/1987 | Tanaka et al. | |
|---|---|---|---|---|---|
| 5,743,242 | A | * | 4/1998 | Thimmesch | 123/549 |
| 5,887,575 | A | * | 3/1999 | Thimmesch et al. | 123/549 |
| 5,988,146 | A | * | 11/1999 | Anderson et al. | 123/549 |
| 5,992,399 | A | * | 11/1999 | Anderson et al. | 123/549 |
| 6,031,204 | A | * | 2/2000 | Prust et al. | 219/206 |
| 6,040,557 | A | * | 3/2000 | Prust et al. | 219/206 |
| 6,073,615 | A | * | 6/2000 | Anderson et al. | 123/549 |
| 6,119,665 | A | * | 9/2000 | Anderson et al. | 123/549 |
| 6,152,117 | A | * | 11/2000 | Prust | 123/556 |
| 6,242,712 | B1 | * | 6/2001 | Prust | 219/206 |
| 6,259,060 | B1 | * | 7/2001 | Prust | 219/206 |
| 6,415,774 | B1 | * | 7/2002 | Wang et al. | 123/556 |
| 6,964,269 | B1 | * | 11/2005 | Gschwind et al. | 123/549 |
| 2004/0129258 | A1 | * | 7/2004 | Carretero et al. | 123/549 |
| 2005/0167411 | A1 | * | 8/2005 | Geiger et al. | 219/206 |

FOREIGN PATENT DOCUMENTS

WO WO 00/34643 A1 6/2000

* cited by examiner

*Primary Examiner*—John A. Jeffery
*Assistant Examiner*—Vinod Patel
(74) *Attorney, Agent, or Firm*—David S. Safran

(57) ABSTRACT

A heating flange especially for the preheating of the intake air of an internal combustion engine with a frame (8), a supporting ceramic element (2) with a heating band (10) fitted thereto. The supporting ceramic element 2 is held in the frame at an inner side of the frame, and a support spring (1) is arranged between the supporting ceramic element (2) and the inner side of the frame. The support spring (1) is a leaf spring which is straight in the non-stressed state, and sits under an initial prestess between the supporting ceramic element (2) and the inner side of the frame. As a result of this configuration, low friction arises between the supporting ceramic element (2) and heating band (10), as well as leaf spring (1), which reduces failures due to vibratory loading, and a defined initial spring tension with a defined spring deflection is produced.

18 Claims, 7 Drawing Sheets

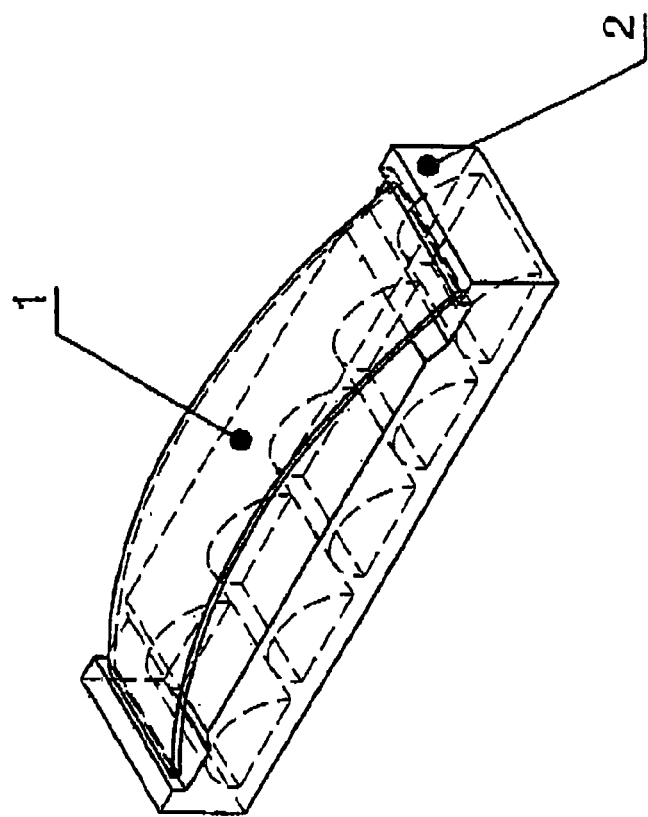
Fig. 1/1
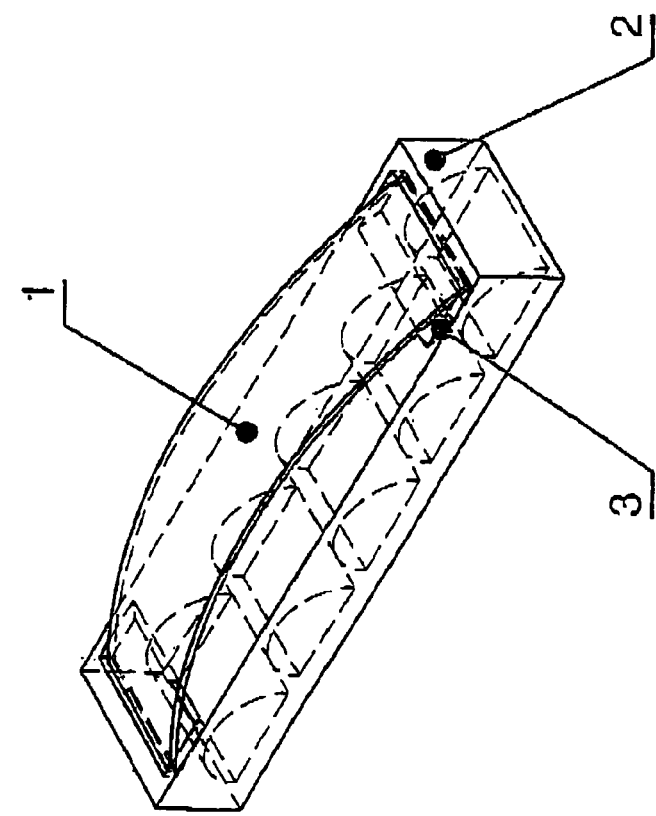
Fig. 1/2

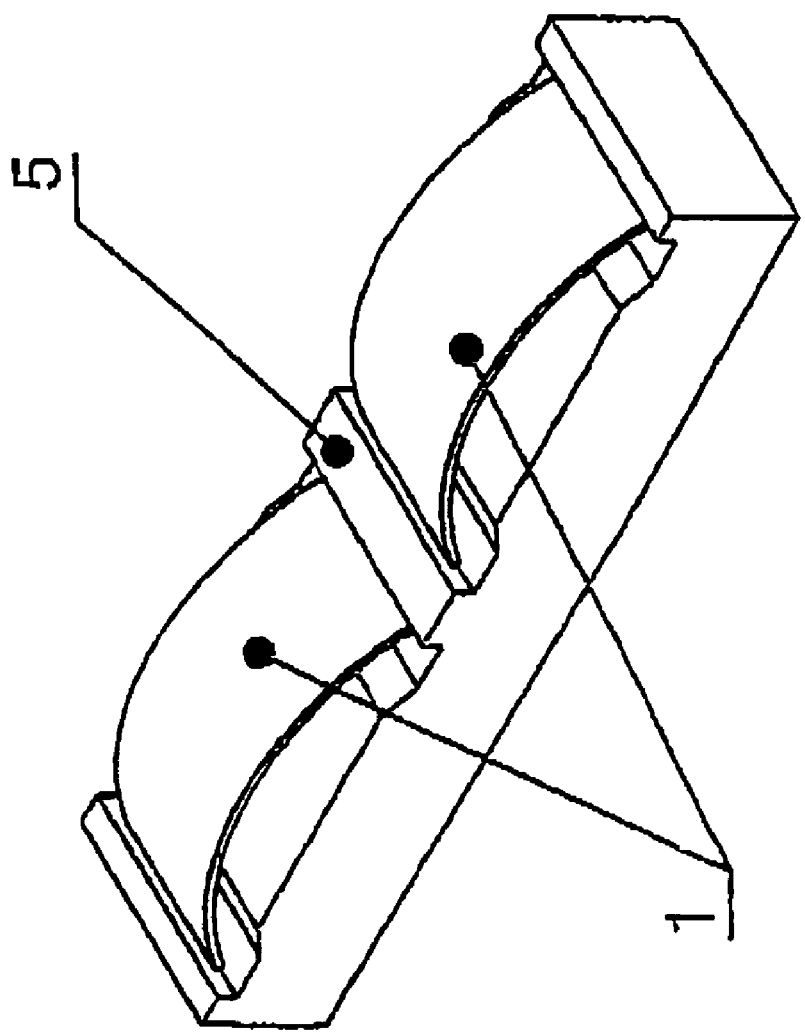

HEATING FLANGE

BACKGROUND OF THE INVENTION

1. Field of the Invention

The invention relates to a heating flange especially for the preheating of the intake air of an internal combustion engine with a frame, a supporting ceramic element with a heating band fitted thereto, said supporting ceramic element being held in the frame to an inner side of the frame, and a support spring arranged between the supporting ceramic element and said inner side of the frame.

2. Description of Related Art

Heating flanges of the above mentioned type are known with a closed frame and with or without a cover and provided with a preformed support spring, whereby the supporting ceramic element and the support spring are held in a mounting, which is fitted to the inner side of the frame.

Such a heating flange is disadvantageous inasmuch as, due to vibratory loading, failures can occur on account of the friction between the ceramic supporting element and the heating band on the one hand and between the ceramic supporting element and the support spring on the other hand. A further disadvantage is to be seen in the fact that the force of the spring support is not defined on account of the preforming of the support spring and that the supporting ceramic element is held with the support spring in a mounting, which means a large number of components.

SUMMARY OF THE INVENTION

The problem underlying the invention, therefore, is to provide a heating flange of the type mentioned above, which operates in a fault-free manner and with which, in particular, the friction between the supporting ceramic element and the heating band on the one hand and the supporting ceramic element and the support spring on the other hand is reduced.

This problem is solved according to the invention by the fact that the support spring is not preformed and is leaf spring which is straight in the unstressed state. The leaf spring is arranged under a prestress between the supporting ceramic element and the inner side of the frame.

Apart from the reduced friction between the supporting ceramic element and the heating band as well as the support spring, a defined spring prestress and a defined spring deflection result with the heating flange according to the invention.

Particularly preferred examples of embodiments of the invention are described below in greater detail with the aid of the accompanying drawings.

BRIEF DESCRIPTION OF THE OF DRAWINGS

Figure 3:
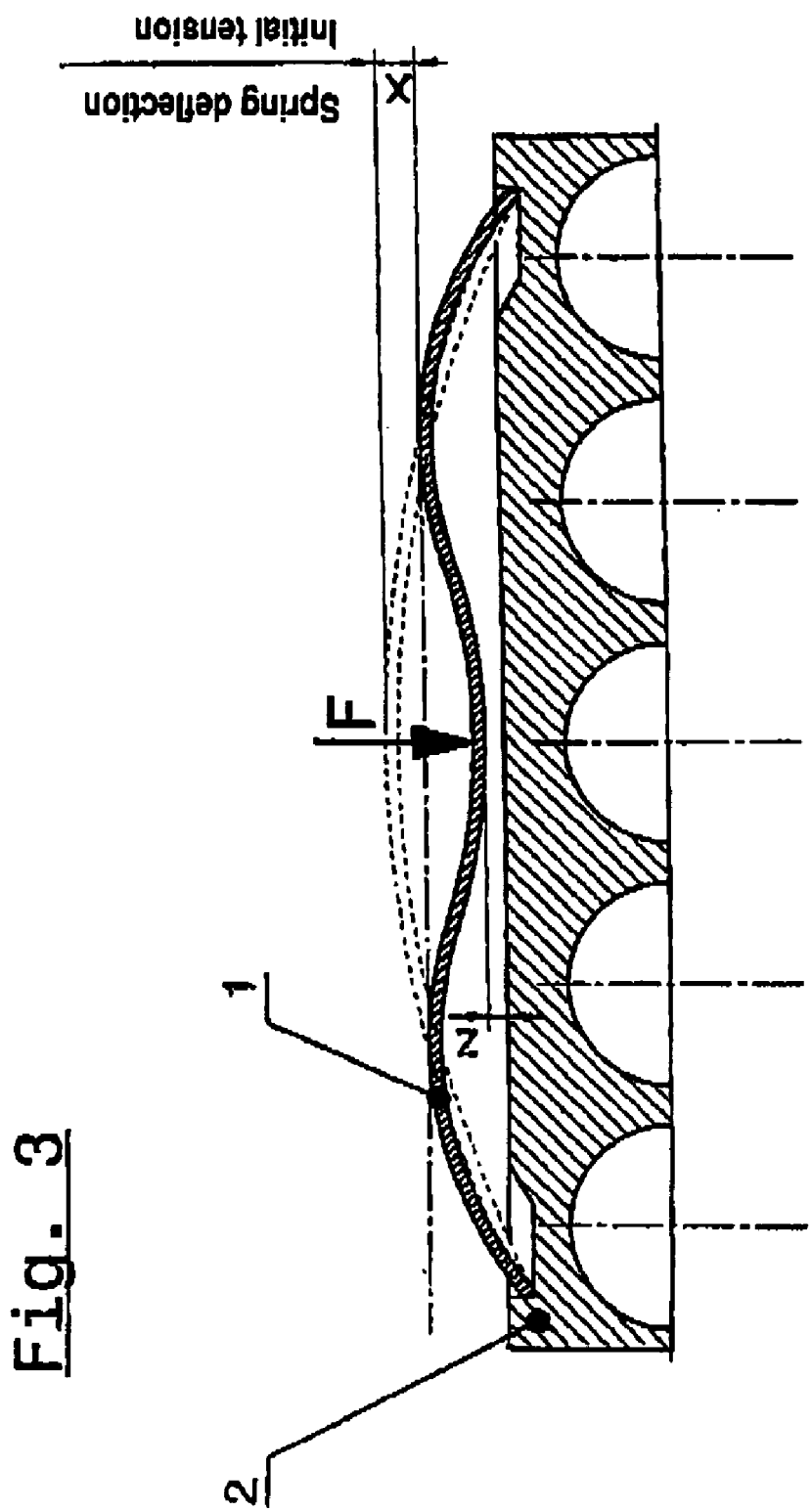
Figure 4:
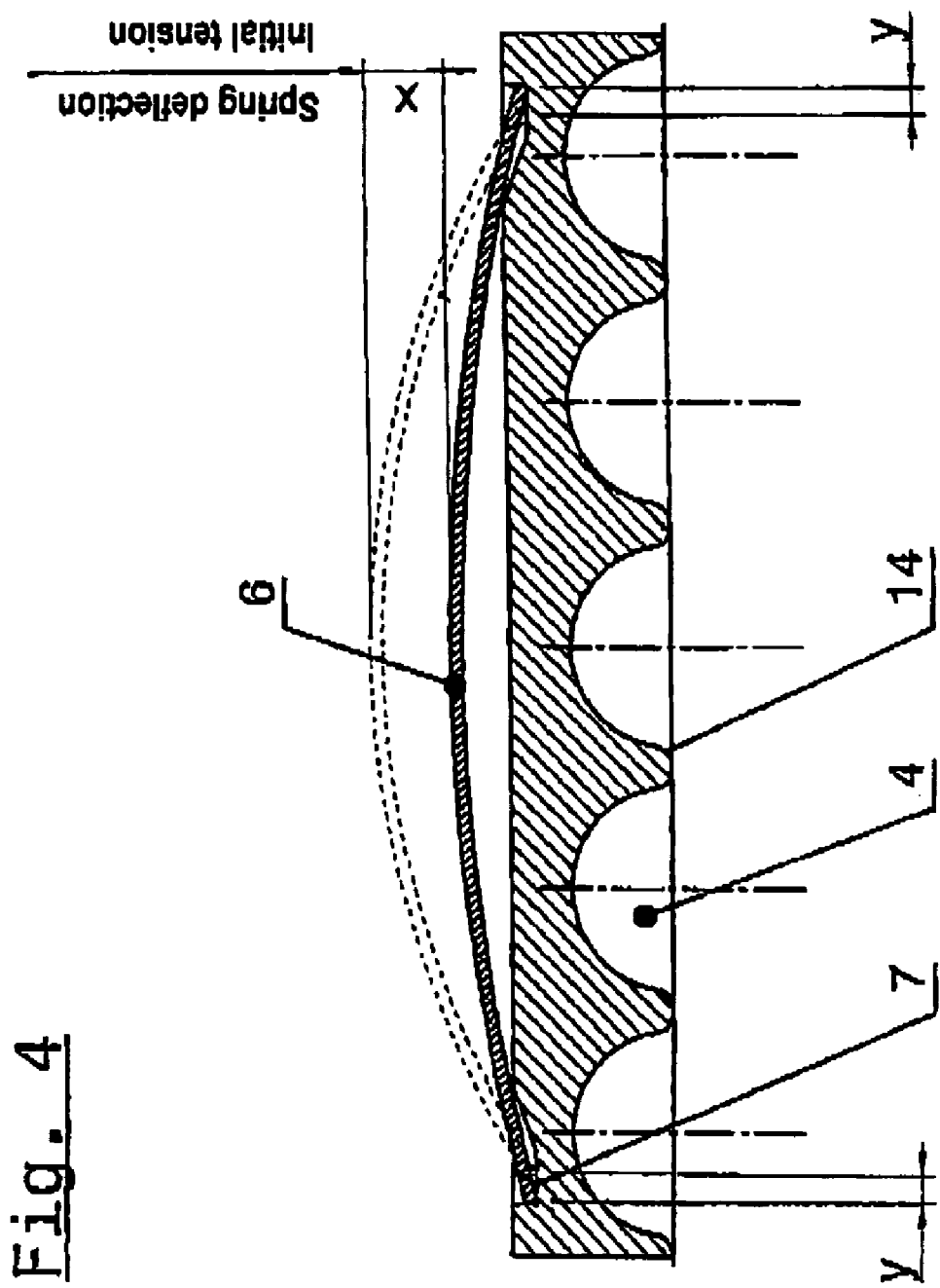
Figure 5:
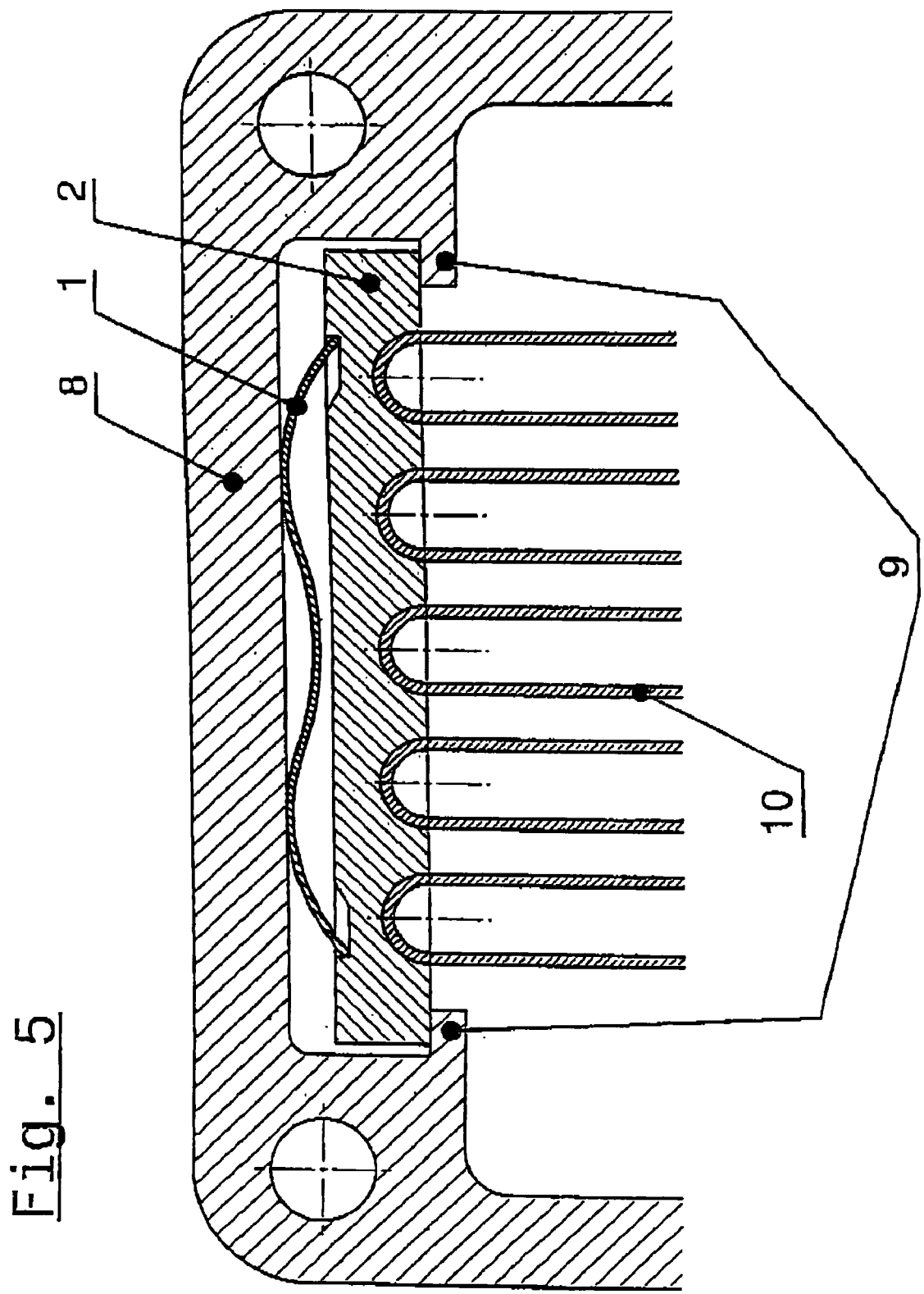
Figure 6:
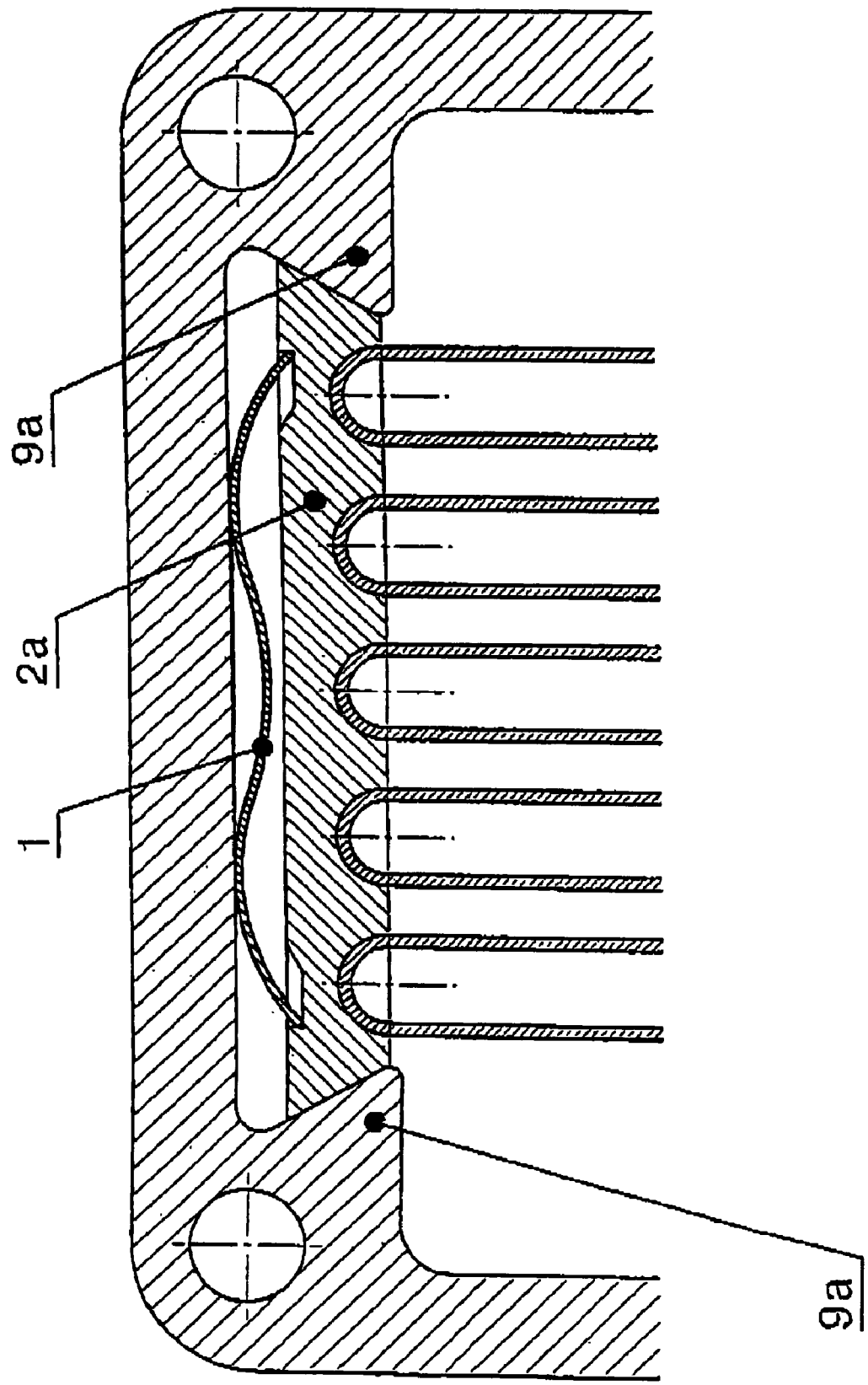
Figure 7:
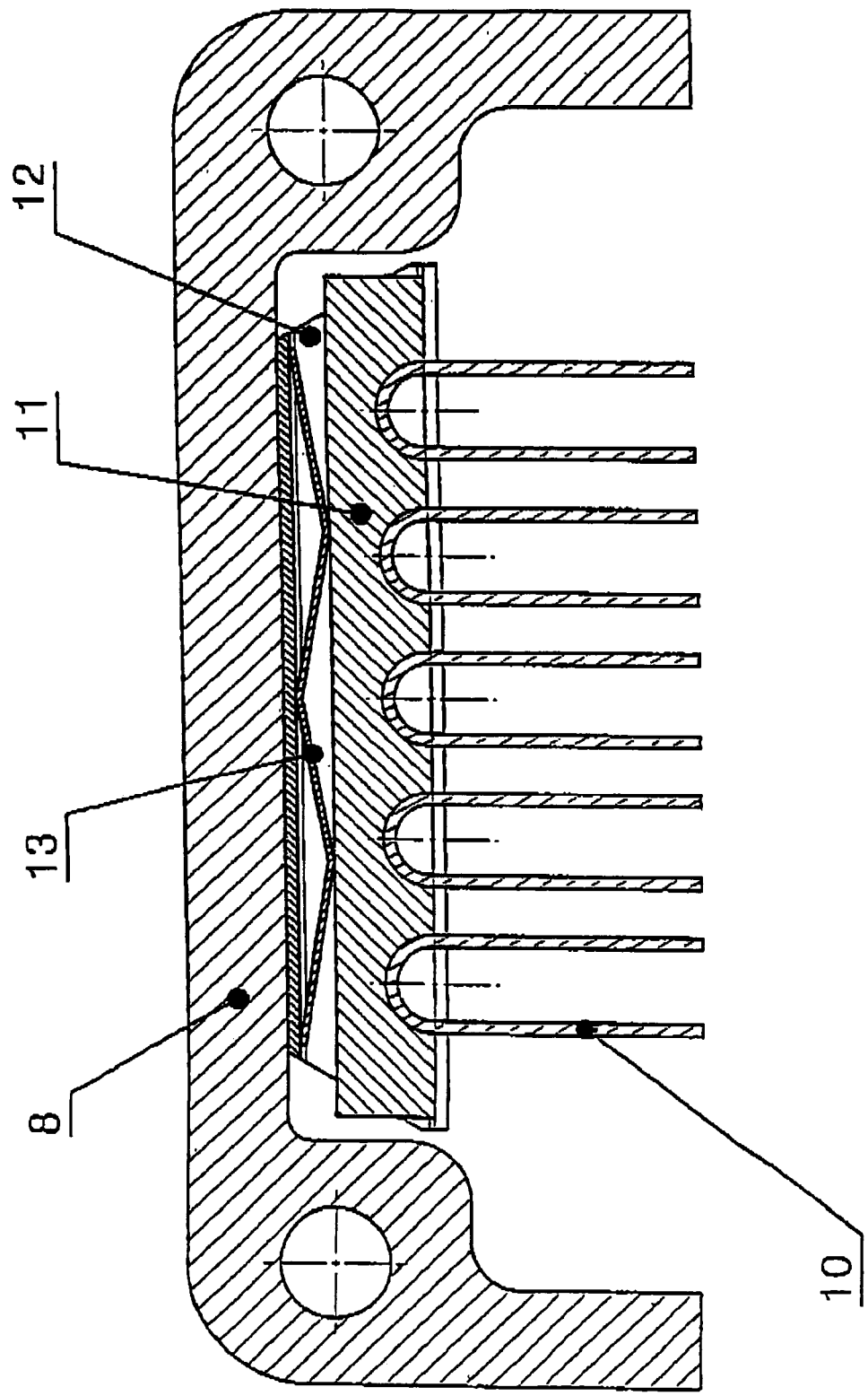

FIGS. 1/1 &. 1/2 are perspective views of a supporting ceramic element with an unassembled and an assembled leaf spring, respectively, FIG. 2 is a perspective view of a supporting ceramic element with two support springs, FIG. 3 is a sectional view showing how a leaf spring, which is the straight in the unstressed state, is arranged under a prestress in the heating flange according to the invention, FIG. 4 is a sectional view of a curved leaf spring with spring length compensation, FIG. 5 is a sectional view of a part of the frame of an embodiment of the heating flange according to the invention with a supporting ceramic element held therein, FIG. 6 is a sectional view corresponding to FIG. 5, but showing a modified embodiment of the mounting for the supporting ceramic element and FIG. 7 is a sectional view of the frame of a known heating flange with a supporting ceramic element arranged therein.

DETAILED DESCRIPTION OF THE INVENTION

As is shown in FIG. 7, a standard heating flange comprises a frame 8, on an inner side of which a supporting ceramic element 11 with heating band 10 held thereto is arranged. A preformed support spring 13 is located between supporting ceramic element 11 and frame 8, whereby supporting ceramic element 11 and support spring 13 are held in a mounting, which is arranged on the inner side of frame 8.

Diverging from the standard heating flange shown in FIG. 7, in the embodiment of the heating flange according to the invention shown in FIGS. 1/1 and 1/2, a leaf spring 1 is provided, according to the invention, which is straight in the unstressed state, the leaf spring being arranged under a prestress between supporting ceramic element 2 and the inner side of the frame.

FIG. 1/1 shows a configuration in which leaf spring 1 is preassembled in supporting ceramic element 2 and additional lateral webs 3 are provided for the lateral support of leaf spring 1.

In the embodiment shown in FIG. 1/2, leaf spring 1 is preassembled in a supporting ceramic element 2 by the fact that grooves are provided in the latter, into which the ends of leaf spring 1 are inserted. It is also possible to provide such grooves together with additional webs 3 for the fixing of leaf spring 1.

It can further be seen from FIGS. 1/1 and 1/2 that recesses are provided on the side of supporting ceramic element 2 facing away from leaf spring 1, said recesses serving to accommodate a heating band.

FIG. 2 shows an embodiment in which two leaf springs 1 are arranged one behind the other in the longitudinal direction of supporting ceramic element 2, the leaf springs being separated from one another by an additional web 5, which is formed in the middle in the longitudinal direction of supporting ceramic element 2. The design of leaf springs 1 and their mounting on supporting ceramic element 2 otherwise corresponds to the embodiment of FIGS. 1/1 and 1/2.

FIG. 3 shows the prestressed shape of leaf spring 1 in a preferred embodiment of the invention. The shape of this leaf spring 1 undulates in the longitudinal direction with two wave crests and a wave trough, whereby the spring deflection produced by assembly force F is equal to X and the wave trough has a distance Z from the surface of supporting ceramic element 2. In this embodiment, a defined deflection X results and support spring 1 bulges with loading F in such a way that it provides support at two points, i.e., the wave crests.

FIG. 4 shows an embodiment in which stressed leaf spring 6 has a curved or arched shape, whereby a compensation path 7 required for the assembly, and thus the loading, is provided in the supporting ceramic element and there is a spring path Y for leaf spring 6 with length compensation. As a result of this compensation path 7, an additional spring path Y results, as can be seen from FIG. 4.

In the embodiment shown in FIG. 4, recesses for a heating band 4 are formed on the side of the supporting ceramic element lying opposite spring 6 and are designed such that the intermediate walls formed between the recesses are rounded off at their end faces and thus form a run-out radius 14. As a result, heating band 4 is not chafed-through by movements arising through vibrations.

FIGS. 5 & 6 show, respectively, two possibilities for mounting of supporting ceramic element 2 on the inner side of the frame. In the embodiment shown in FIG. 5, support webs 9 are molded onto frame 8 and supporting ceramic element 2 is arranged between support webs 9 and the inner side of the frame. In this way, the path of supporting ceramic element 2 is limited by support webs 9.

In the embodiment shown in FIG. 6, support webs 9a are beveled in such a way that they run obliquely inwards from the inner side of the frame and the supporting ceramic element 2a has beveled end faces formed complementary thereto.

A mounting for holding the supporting ceramic element and the support spring, such as is provided in standard heating flanges, is thus dispensed with.

Leaf spring 1 or 6 can have a thickness between 0.1 and 0.6 mm, depending on the prestressing force F. It can, in particular, be selected such that there is no loss of spring tension up to a temperature of at least 250° C., which can be achieved, for example, with use of a material such as 1.4310 steel.

It can be seen from the above that, with the heating flange according to the invention, the leaf spring can be preassembled without a mounting and is not preformed. Friction between a metal element and a ceramic element is thus avoided. A more precisely defined spring force also results from the use of a non-preformed spring.

What is claimed is:

1. A heating flange especially for the preheating of the intake air of an internal combustion engine with
    a frame,
    a supporting ceramic element with a heating band fitted thereto, said supporting ceramic element being held in the frame at an inner side of the frame, and
    a support spring arranged between the supporting ceramic element and said inner side of the frame,
wherein
    the support spring is a leaf spring which is straight in an unstressed state, said leaf spring being arranged under a prestress between the supporting ceramic element and the inner side of the frame; and
    accommodation grooves are provided in the supporting ceramic element, and wherein ends of the leaf spring sit in said accommodation grooves.

2. The heating flange according to claim 1, wherein the supporting ceramic element has webs for fixing the leaf spring.

3. The heating flange according to claim 2, wherein recesses are provided on a side of the supporting ceramic element lying opposite the leaf spring, and wherein the heating band are accommodated in said recesses.

4. The heating flange according to claim 3, wherein walls between the recesses in the ceramic supporting element are rounded off at end faces thereof.

5. The heating flange according to claim 4, wherein at least two leaf springs are provided, one behind the other in the longitudinal direction of the supporting ceramic element, said leaf springs being separated from one another by an intermediate web on the supporting ceramic element.

6. The heating flange according to claim 5, wherein the leaf spring is curved in the stressed state and a compensation path is provided in the supporting ceramic element for compensating for the length of the leaf when the leaf spring is stressed during the assembly.

7. The heating flange according to claim 6, wherein lateral frame webs have been molded onto the frame, and the supporting ceramic element is arranged between the frame webs and an inner side of the frame.

8. The heating flange according to claim 7, wherein the frame webs run obliquely inwards from the inner side of the frame and the supporting ceramic element has end faces formed complementary thereto.

9. The heating flange according to claim 5, wherein the leaf spring, in the stressed state, has an undulating shape with two wave crests in the longitudinal direction.

10. The heating flange according to claim 9, wherein lateral frame webs have been molded onto the frame, and the supporting ceramic element is arranged between the frame webs and an inner side of the frame.

11. The heating flange according to claim 10, wherein the frame webs run obliquely inwards from the inner side of the frame and the supporting ceramic element has end faces formed complementary thereto.

12. The heating flange according to claim 1, wherein recesses are provided on a side of the supporting ceramic element lying opposite the leaf spring, and wherein the heating band accommodated in said recesses.

13. The heating flange according to claim 12, wherein walls between the recesses in the ceramic supporting element are rounded off at end faces thereof.

14. The heating flange according to claim 1, wherein at least two leaf springs are provided, one behind the other in the longitudinal direction of the supporting ceramic element, said leaf springs being separated from one another by an intermediate web on the supporting ceramic element.

15. The heating flange according to claim 1, wherein the leaf spring is curved in the stressed state and a compensation path is provided in the supporting ceramic element for compensating for the length of the leaf when the leaf spring is stressed during the assembly.

16. The heating flange according to claim 1, wherein the leaf spring, in the stressed state, has an undulating shape with two wave crests in the longitudinal direction.

17. The heating flange according to claim 1, wherein lateral frame webs have been molded onto the frame, and the supporting ceramic element is arranged between the frame webs and an inner side of the frame.

18. The heating flange according to claim 17, wherein the frame webs run obliquely inwards from the inner side of the frame and the supporting ceramic element has end faces formed complementary thereto.

* * * * *